United States Patent
Suemitsu et al.

(10) Patent No.: US 11,441,821 B2
(45) Date of Patent: Sep. 13, 2022

(54) HEAT PUMP AND METHOD FOR DESIGNING THE SAME

(71) Applicants: MITSUBISHI HEAVY INDUSTRIES THERMAL SYSTEMS, LTD., Tokyo (JP); CENTRAL GLASS COMPANY, LTD, Ube (JP)

(72) Inventors: Ryosuke Suemitsu, Tokyo (JP); Kenji Ueda, Tokyo (JP); Yasushi Hasegawa, Tokyo (JP); Kazuki Wajima, Tokyo (JP); Yoshinori Akamatsu, Tokyo (JP); Fuyuhiko Sakyu, Saitama (JP); Kanako Osafune, Saitama (JP)

(73) Assignees: Mitsubishi Heavy Industries Thermal System, Ltd., Tokyo (JP); Central Glass Co., Ltd., Ube (JP)

( * ) Notice: Subject to any disclaimer, the term of this patent is extended or adjusted under 35 U.S.C. 154(b) by 373 days.

(21) Appl. No.: 16/489,622

(22) PCT Filed: Jun. 28, 2018

(86) PCT No.: PCT/JP2018/024499
§ 371 (c)(1),
(2) Date: Aug. 28, 2019

(87) PCT Pub. No.: WO2019/031094
PCT Pub. Date: Feb. 14, 2019

(65) Prior Publication Data
US 2019/0390878 A1    Dec. 26, 2019

(30) Foreign Application Priority Data
Aug. 10, 2017 (JP) .............................. JP2017-155616

(51) Int. Cl.
*F25B 1/10* (2006.01)
*F25B 49/02* (2006.01)

(52) U.S. Cl.
CPC ................ *F25B 1/10* (2013.01); *F25B 49/02* (2013.01); *F25B 2313/02792* (2013.01)

(58) Field of Classification Search
CPC .. F25B 1/10; F25B 49/02; F25B 2313/02792; F25B 2400/121; F25B 1/00; C09K 2205/126; C09K 5/044
See application file for complete search history.

(56) References Cited

U.S. PATENT DOCUMENTS 5,582,020 A * 12/1996 Scaringe ................ C09K 5/041
                                                              62/476
2013/0247597 A1    9/2013 Kontomaris
(Continued)

FOREIGN PATENT DOCUMENTS

JP    2012-202565 A    10/2012
JP    2016-194377 A    11/2016
(Continued)

OTHER PUBLICATIONS

International Search Report and Written Opinion for international Application No. PCT/JP2018/024499, dated Sep. 11, 2018, with an English translation.
(Continued)

Primary Examiner — Emmanuel E Duke
(74) Attorney, Agent, or Firm — Birch, Stewart, Kolasch & Birch, LLP

(57) ABSTRACT

It is an object of the present invention to provide a heat pump that can use, as a refrigerant, a substance with which a geometric isomer exists, and a method for designing the same. The present invention is a method for designing a heat pump (1) whose closed circuit configured by connecting a compressor (2), a condenser (3), an expansion valve (4), and an evaporator (5) in this order is filled with a refrigerant containing a refrigerant substance with which a geometric isomer may exist, the method including obtaining an upper
(Continued)

limit of stable temperature at which isomerization of the refrigerant substance does not proceed, and setting an upper limit usage temperature of the heat pump (1) so as not to exceed the upper limit of the stable temperature.

3 Claims, 4 Drawing Sheets

(56) References Cited

U.S. PATENT DOCUMENTS

| | | | |
|---|---|---|---|
| 2016/0178254 A1* | 6/2016 | Nishiguchi | C09K 5/045 |
| | | | 62/238.7 |
| 2016/0200955 A1* | 7/2016 | Ueda | C09K 5/044 |
| | | | 252/68 |
| 2016/0201958 A1* | 7/2016 | Ueda | C09K 5/044 |
| | | | 62/474 |
| 2018/0066871 A1 | 3/2018 | Matsukura et al. | |
| 2018/0347860 A1 | 12/2018 | Wajima et al. | |

FOREIGN PATENT DOCUMENTS

| | | | |
|---|---|---|---|
| JP | 2017-71792 A | 4/2017 | |
| JP | 2017-141372 A | 8/2017 | |
| WO | WO 2015/060400 A1 | 4/2015 | |
| WO | WO-2017002925 A1 * | 1/2017 | B01J 21/04 |

OTHER PUBLICATIONS

Office Action dated Sep. 1, 2020 in related Japanese Patent Application No. 2017-155616 with an English Translation.

* cited by examiner

HEAT PUMP AND METHOD FOR DESIGNING THE SAME

TECHNICAL FIELD

The present invention relates to a heat pump filled with a refrigerant containing a refrigerant substance with which a geometric isomer may exist, and to a method for designing the same.

BACKGROUND ART

In an electric heat pump that heats and supplies hot water, a refrigerant is circulated in the inner part. In recent years, considering the environment, it has been desired to use a refrigerant with a low global warming potential (GWP).

Further, in order to expand the application, it has been desired to increase the temperature of a heat pump, and the use of a refrigerant of various substances in a heat pump at high temperature has been studied.

Patent Literature 1 discloses, as a refrigerant with a low GWP, a substance having a carbon-carbon double bond, such as hydrofluoroolefin (HFO) or hydrochlorofluoroolefin (HCFO).

CITATION LIST

Patent Literature

{PTL 1} Japanese Unexamined Patent Application, Publication No. 2016-194377

SUMMARY OF INVENTION

Technical Problem

A substance having a carbon-carbon double bond includes one with which a geometric isomer exists. The geometric isomer is a substance that has a same composition and has a different three-dimensional structure, which is called E form (trans structure)/Z form (cis structure).

A substance with which a geometric isomer exists may exist as a single substance in either one of the two forms (an E form or Z form) at ordinary temperature. However, there is one in which part of a single substance changes to a geometric isomer that differs in physical properties (particularly boiling point) by being exposed to a high temperature environment for a long time (hereinafter referred to as isomerization).

Therefore, in an instrument equipped with a refrigeration cycle/heating cycle, which is designed on the assumption of a single refrigerant, there is a problem that a substance with which a geometric isomer exists cannot be used as a refrigerant.

The present invention has been made in view of such a circumstance, and an object of the present invention is to provide a heat pump that can stably use, as a refrigerant, a substance with which a geometric isomer exists, and a method for designing the same.

Solution to Problem

As a result of keen study, the present inventors have found that a refrigerant substance with which a geometric isomer may exist (compound having a double bond in the molecule) has a temperature at which isomerization is not generated, and even in a case where the refrigerant substance reaches a temperature at which isomerization is generated, there is a tendency that the isomerization is stabilized when the geometric isomer is present at a certain ratio. The ratio at which the isomerization is stabilized depends on the temperature.

The present invention is to provide a method for designing a heat pump whose closed circuit configured by connecting a compressor, a condenser, an expansion valve, and an evaporator in this order is filled with a refrigerant containing a refrigerant substance with which a geometric isomer may exist, the method including obtaining an upper limit of stable temperature at which isomerization of the refrigerant substance does not proceed, and setting an upper limit usage temperature so as not to exceed the upper limit of the stable temperature.

In the above invention, by obtaining the temperature characteristics of isomerization of a refrigerant substance (temperature at which isomerization is not generated, or temperature at which isomerization does not proceed), a heat pump in which a refrigerant substance is not isomerized during the operation can be designed. With the heat pump, a stable heat cycle can be realized even in a case where a refrigerant substance with which a geometric isomer may exist is adopted as a single refrigerant.

The present invention is to provide a method for designing a heat pump whose closed circuit configured by connecting a compressor, a condenser, an expansion valve, and an evaporator in this order is filled with a refrigerant containing a refrigerant substance with which a geometric isomer may exist, the method including obtaining a first equilibrium concentration of the refrigerant substance and the geometric isomer of the refrigerant substance at an upper limit usage temperature of the heat pump, and using, as an initial refrigerant, a mixed refrigerant in which the refrigerant substance and the geometric isomer are mixed and in which the geometric isomer is contained at a concentration of the first equilibrium concentration or more.

In the above invention, the concentration at which isomerization is stabilized (equilibrium concentration) is obtained, and the geometric isomer concentration is kept at a concentration of the equilibrium concentration or more. With such a mixed solvent, the isomerization is not further generated. Therefore, with a single substance, even in a case where the temperature reaches a temperature at which isomerization is generated, the changes in physical properties of the refrigerant due to isomerization are not caused.

In one aspect of the above invention, it is preferable to obtain a second equilibrium concentration of the refrigerant substance and the geometric isomer at a temperature in the condenser, and to control a temperature of a heat exchange medium in the condenser such that a concentration of the geometric isomer in a mixed refrigerant liquid condensed by the condenser is maintained at a concentration of the second equilibrium concentration or more.

In a case where the boiling point of a refrigerant substance is different from the boiling point of the geometric isomer of the refrigerant substance, the mixed refrigerant is a non-azeotropic mixed refrigerant. With the non-azeotropic mixed refrigerant, there is a scene where the geometric isomer concentration in a condensate liquid changes during a condensation process in a condenser. By controlling the temperature of the heat exchange medium as described above, and maintaining the geometric isomer concentration in the condensate liquid at a concentration of the equilibrium concentration or more, the isomerization of the refrigerant substance can be suppressed.

The present invention is to provide a heat pump whose closed circuit configured by connecting a compressor, a condenser, an expansion valve, and an evaporator in this order is filled with a refrigerant containing a refrigerant substance with which a geometric isomer may exist, wherein an upper limit of stable temperature at which isomerization of the refrigerant substance does not proceed is obtained, and an upper limit usage temperature is set such that an operation temperature of the refrigerant does not exceed the upper limit of the stable temperature.

The present invention is to provide a heat pump whose closed circuit configured by connecting a compressor, a condenser, an expansion valve, and an evaporator in this order is filled with a refrigerant containing a refrigerant substance with which a geometric isomer may exist, wherein a first equilibrium concentration of the refrigerant substance and the geometric isomer of the refrigerant substance at an upper limit usage temperature of the heat pump is obtained, and the closed circuit is filled with a mixed refrigerant, as an initial refrigerant, in which the refrigerant substance and the geometric isomer are mixed and in which the geometric isomer is contained at a concentration of the first equilibrium concentration or more.

Advantageous Effects of Invention

According to the present invention, a heat pump is designed by obtaining the temperature characteristics of isomerization of a refrigerant, a substance with which a geometric isomer exists can be stably used as a refrigerant.

DESCRIPTION OF EMBODIMENTS

Figure 1:
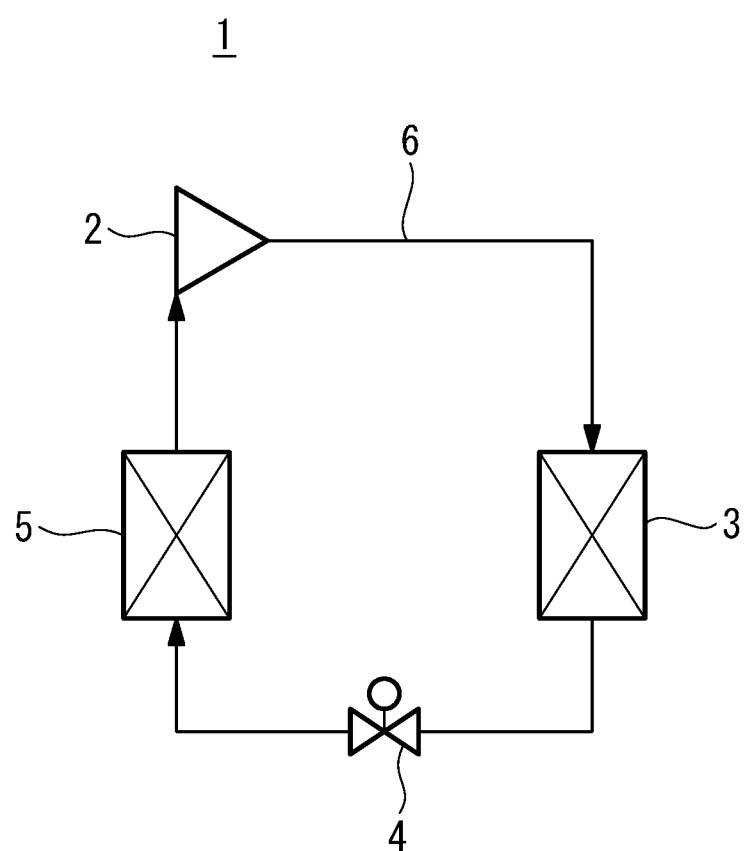
FIG. 1 is a schematic configuration diagram of the heat pump according to one aspect of the present invention.

The basic configuration of the heat pump according to the present invention will be described with reference to FIG. 1.

A heat pump 1 is provided with a compressor 2, a condenser 3, an expansion valve 4, and an evaporator 5. The compressor 2, the condenser 3, the expansion valve 4, and the evaporator 5 are connected in this order with a pipe 6 to form a closed circuit (heat pump cycle). Each of the component members of the heat pump 1 is designed to withstand the pressure from the refrigerant. In the heat pump cycle, a refrigerant is arranged (filled).

A compressor 2 sucks a refrigerant flowing from an evaporator 5, compresses the refrigerant, and then discharges the compressed refrigerant toward a condenser 3. As the compressor 2, a known turbo compressor can be used. The compressor 2 may be a multistage compressor. Multiple compressors 2 may be arranged.

The compressor 2 is provided with a suction port for sucking a refrigerant, and a discharge port for discharging a compressed refrigerant. To the discharge port of the compressor 2, a discharge pipe for discharging a compressed refrigerant gas toward a condenser 3 is connected.

The condenser 3 cools and condenses the refrigerant compressed by the compressor 2, and can make the refrigerant into a refrigerant liquid. The condenser 3 may be a plate-type heat exchanger, a shell and tube-type heat exchanger, or the like. One or multiple condensers 3 may be arranged. The condenser 3 is provided with an inflow pipe into which the compressed refrigerant flows, and an outflow pipe from which the refrigerant condensed in the condenser 3 flows out.

An expansion valve 4 is a valve that adiabatically expands the refrigerant liquid condensed in the condenser 3 to reduce the pressure. As the expansion valve 4, a known one can be used.

An evaporator 5 evaporates the refrigerant liquid adiabatically expanded by the expansion valve 4. The evaporator 5 may be a plate-type heat exchanger, a shell and tube-type heat exchanger, or the like.

The refrigerant includes a refrigerant substance as the main component. The refrigerant substance is a compound which has a carbon-carbon double bond in the molecular structure, and with which a geometric isomer may exists. The main component means a component contained in the largest amount.

Specifically, the refrigerant substance is hydrofluoroolefin (HFO) or hydrochlorofluoroolefin (HCFO).

Examples of the hydrofluoroolefin (HFO) include (Z)-1,3,3,3-tetrafluoro-1-propene (HFO1234ze (Z)), (E)-1,3,3,3-tetrafluoro-1-propene (HFO1234ze (E)), (Z)-1,2,3,3-tetrafluoro-1-propene (HFO1234ye (Z)), (E)-1,2,3,3-tetrafluoro-1-propene (HFO1234ye (E)), (Z)-1,2,3,3,3-pentafluoro-1-propene (HFO1225ye (Z)), (E)-1,2,3,3,3-pentafluoro-1-propene (HFO1225ye (E)), (Z)-1,1,1,4,4,4-hexafluoro-2-butene (HFO1336mzz (Z)), (E)-1,1,1,4,4,4-hexafluoro-2-butene (HFO1336mzz (E)), (Z)-1,1,1,4,4,5,5,5-octafluoro-2-pentene (HFO-1438mzz (Z)), and (E)-1,1,1,4,4,5,5,5-octafluoro-2-pentene (HFO-1438mzz (E)).

Examples of the hydrochlorofluoroolefin (HCFO) include (E)-1-chloro-3,3,3-trifluoropropene (HCFO1233zd (E)), (Z)-1-chloro-3,3,3-trifluoropropene (HCFO1233zd (Z)), (E)-1,2-dichloro-3,3,3-trifluoropropene (HCFO1223xd (E)), (Z)-1,2-dichloro-3,3,3-trifluoropropene (HCFO1223xd (Z)), (E)-1-chloro-2,3,3,3-tetrafluoropropene (HCFO-1224yd (E)), and (Z)-1-chloro-2,3,3,3-tetrafluoropropene (HCFO-1224yd (Z)).

The refrigerant may contain an additive. Examples of the additive include halocarbons, other hydrofluorocarbons (HFC), alcohols, and saturated hydrocarbons.

<Halocarbons, and Other Hydrofluorocarbons>

Examples of the halocarbons include methylene chloride containing a halogen atom, trichloroethylene, and tetrachloroethylene.

Examples of the hydrofluorocarbons include difluoromethane (HFC-32), 1,1,1,2,2-pentafluoroethane (HFC-125), fluoroethane (HFC-161), 1,1,2,2-tetrafluoroethane (HFC-134), 1,1,1,2-tetrafluoroethane (HFC-134a), 1,1,1-trifluoroethane (HFC-143a), difluoroethane (HFC-152a), 1,1,1,2,3,3,3-heptafluoropropane (HFC-227ea), 1,1,1,2,3-pentafluoropropane (HFC-236ea), 1,1,1,3,3,3-hexafluoropropane (HFC-236fa), 1,1,1,3,3-pentafluoropropane (HFC-245fa), 1,1,2,3-pentafluoropropane (HFC-245eb), 1,1,2,2,3-pentafluoropropane (HFC-245ca), 1,1,1,3,3-pentafluorobutane (HFC-365mfc), 1,1,1,3,3,3-hexafluoroisobutane (HFC-356mmz), and 1,1,1,2,2,3,4,5,5,5-decafluoropentane (HFC-43-10-mee).

<Alcohols>

As the alcohols, alcohol having 1 to 4 carbon atoms can be mentioned, and specific examples of the alcohols include methanol, ethanol, n-propanol, i-propanol, n-butanol, i-butanol, 2,2,2-trifluoroethanol, pentafluoropropanol, tetrafluoropropanol, and 1,1,1,3,3,3-hexafluoro-2-propanol.

<Saturated Hydrocarbons>

As the saturated hydrocarbons, a saturated hydrocarbon having 3 or more and 8 or less carbon atoms can be mentioned, and specifically, at least one or more compounds selected from the group consisting of propane, n-butane, i-butane, neopentane, n-pentane, i-pentane, cyclopentane, methyl cyclopentane, n-hexane, and cyclohexane can be mixed. Among them, as the particularly preferred substance, neopentane, n-pentane, i-pentane, cyclopentane, methyl cyclopentane, n-hexane, or cyclohexane can be mentioned.

First Embodiment

A method for designing a heat pump according to the present embodiment will be described.

In the present embodiment, a heat pump cycle is filled with a single refrigerant, as the initial refrigerant, containing a refrigerant substance as the main component. The single refrigerant means a refrigerant substance containing a main component substance in an amount of 99.5% or more.

First, the upper limit of stable temperature at which isomerization of a refrigerant substance does not proceed in a single refrigerant is obtained.

The expression "isomerization" means that a refrigerant substance in a Z form changes to a refrigerant substance in an E form, or a refrigerant substance in an E form changes to a refrigerant substance in a Z form. The expression "isomerization does not proceed" includes a state that the three-dimensional structure of a refrigerant substance does not change from the initial state, or a state that the concentration of the geometric isomer generated due to the isomerization is suppressed to 0.5% or less.

The upper limit of the stable temperature of a refrigerant substance is obtained as follows.

The thermal stability and the stable composition are evaluated for each temperature by a method in accordance with the sealed tube test (JIS K 2211). JIS is an abbreviation for Japanese Industrial Standards.

Next, the upper limit usage temperature of a heat pump is set so as not to exceed the upper limit of the obtained stable temperature, and a heat pump is designed.

The upper limit usage temperature can be adjusted by setting an abnormal stop upper limit temperature of the heat pump.

By determining the upper limit usage temperature as described above to design a heat pump, the isomerization of a refrigerant substance circulating in the heat pump cycle can be suppressed, and therefore, a stable heat cycle can be maintained.

Second Embodiment

In the present embodiment, a heat pump cycle is filled with a mixed refrigerant, as the initial refrigerant, containing a refrigerant substance as the main component and containing a geometric isomer of the refrigerant substance at a predetermined concentration or more.

The predetermined concentration is a concentration at which the isomerization of the geometric isomer becomes stable (first equilibrium concentration) at the upper limit usage temperature of the heat pump. The expression "isomerization becomes stable" means that the concentration of the geometric isomer does not change, or that the variation width of the concentration of the geometric isomers is acceptable within ±0.5%.

In the present embodiment, first, a filling refrigerant substance is determined, and then a first equilibrium concentration of the refrigerant substance and the geometric isomer of the refrigerant substance at the upper limit usage temperature of the heat pump is obtained.

Next, a mixed refrigerant, in which a refrigerant substance and the geometric isomer are mixed and in which the concentration of the geometric isomer is a concentration of a first equilibrium concentration or more, is prepared to fill a refrigerant circulation circuit as the initial refrigerant.

The following is a test example performed in order to obtain the equilibrium concentration.

The test tube was depressurized to a vacuum (around 1 Pa), and a refrigerant substance (100 g) was placed in the test tube. After standing for a certain period of time at a predetermined temperature, the geometric isomer concentration of the refrigerant substance was measured.

The test conditions are as follows.

Refrigerant substance: HCFO-1223xd (Z) (having a purity of 100 GC %)

Test temperature: 175° C., 225° C., and 250° C.

The number of test days: 14 days, 28 days, 56 days, and 90 days

Test tube: SUS 316 (having a volume of 120 ml, and SUS stands for stainless steel)

In this regard, on the assumption of an actual heat pump, three kinds of metal pieces, which are a piece of copper (JIS C3102), a piece of iron (JIS C2504), and a piece of aluminum (JIS H4040), each having an outer diameter of 1.6 mm and a length of 50 mm, were mixed in each test tube, and the test tube was contaminated with 100 ppm of air and 10 ppm of water.

In the measurement of geometric isomer concentration, a gas chromatograph with a flame ionization detector (FID) (2010 plus manufactured by Shimadzu Corporation) was used.

Figure 2:
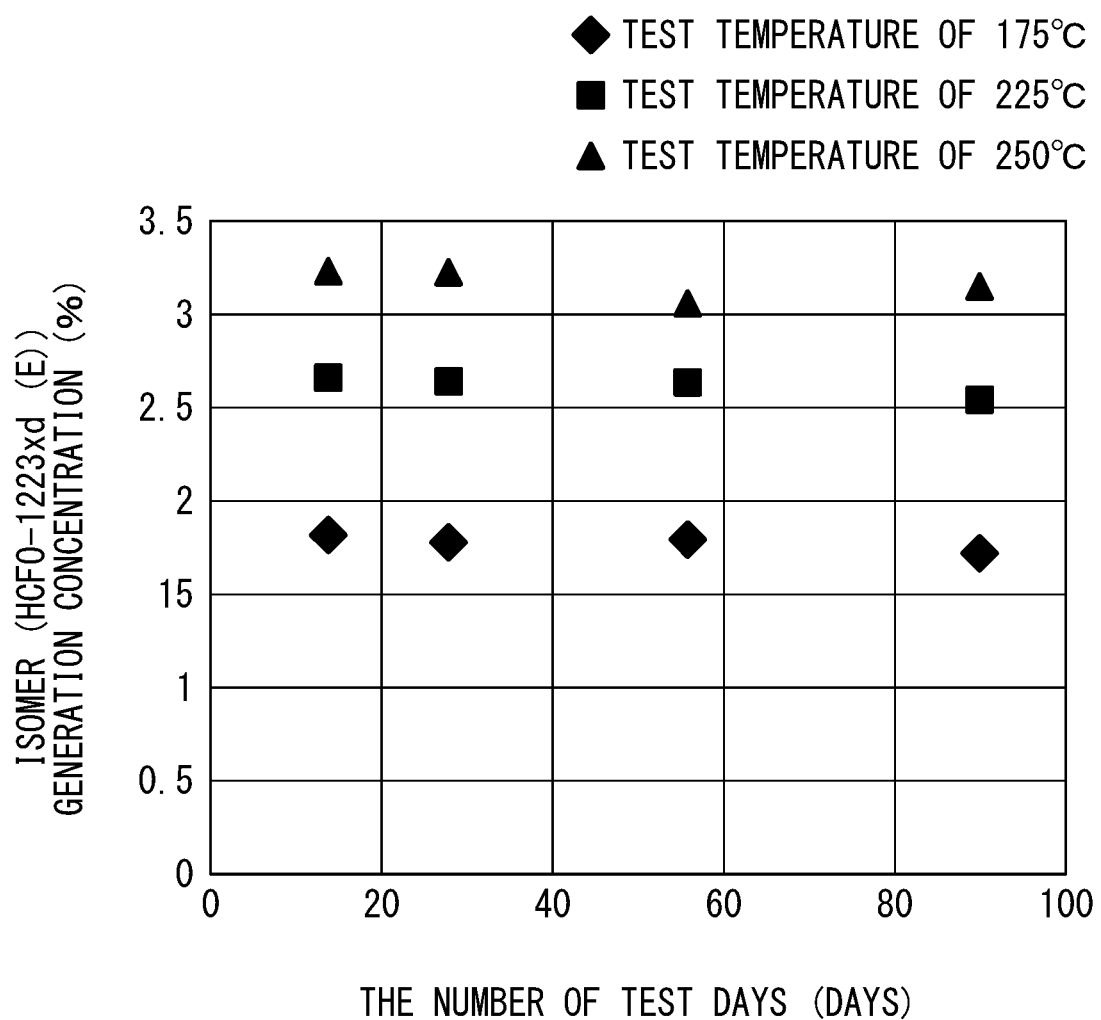
FIG. 2 is a diagram showing the test results for obtaining an equilibrium concentration.

The test results are shown in FIG. 2. In FIG. 2, the horizontal axis is the number of test days (days), and the vertical axis is the geometric isomer (HCFO-1223xd (E)) generation concentration (GC %).

According to FIG. 2, the higher the test temperature was, the more geometric isomers were generated. The concentration of the geometric isomers was around 1.8 GC % in the test tube at 175° C., around 2.6% in the test tube at 225° C., and around 3.2% in the test tube at 250° C.

According to FIG. 2, regardless of the test temperature, the concentration of geometric isomers was stable without increase for 14 days to 100 days.

From the above results, it has been confirmed that the isomerization of a refrigerant substance with which a geometric isomer may exist tends to be stable at a certain concentration (ratio), and the concentration (first equilibrium concentration) differs for each of the temperatures.

According to the study of the present inventors, it has been confirmed that with respect to HFO, HCFO, and the geometric isomers of HFO and HCFO, almost no isomerization reaction is generated in several years or several decades if the temperature is constant. That is, the isomerization of the geometric isomers existing at a concentration of the first equilibrium concentration or more does not further proceed if the temperature is constant.

By obtaining the concentration (first equilibrium concentration) at which the isomerization of a refrigerant substance is stabilized at the upper limit usage temperature of a heat pump, and by mixing a geometric isomer together with the refrigerant substance in a refrigerant such that the concentration of the geometric isomer can be a concentration of the first equilibrium concentration or more, there is no further increase of the geometric isomer during heat pump operation, and therefore, the refrigerant can be handled as a mixed refrigerant free of the concentration change due to isomerization. Such a mixed refrigerant can be stably used even at a high temperature at which the isomerization of a single substance is generated.

Figure 3:
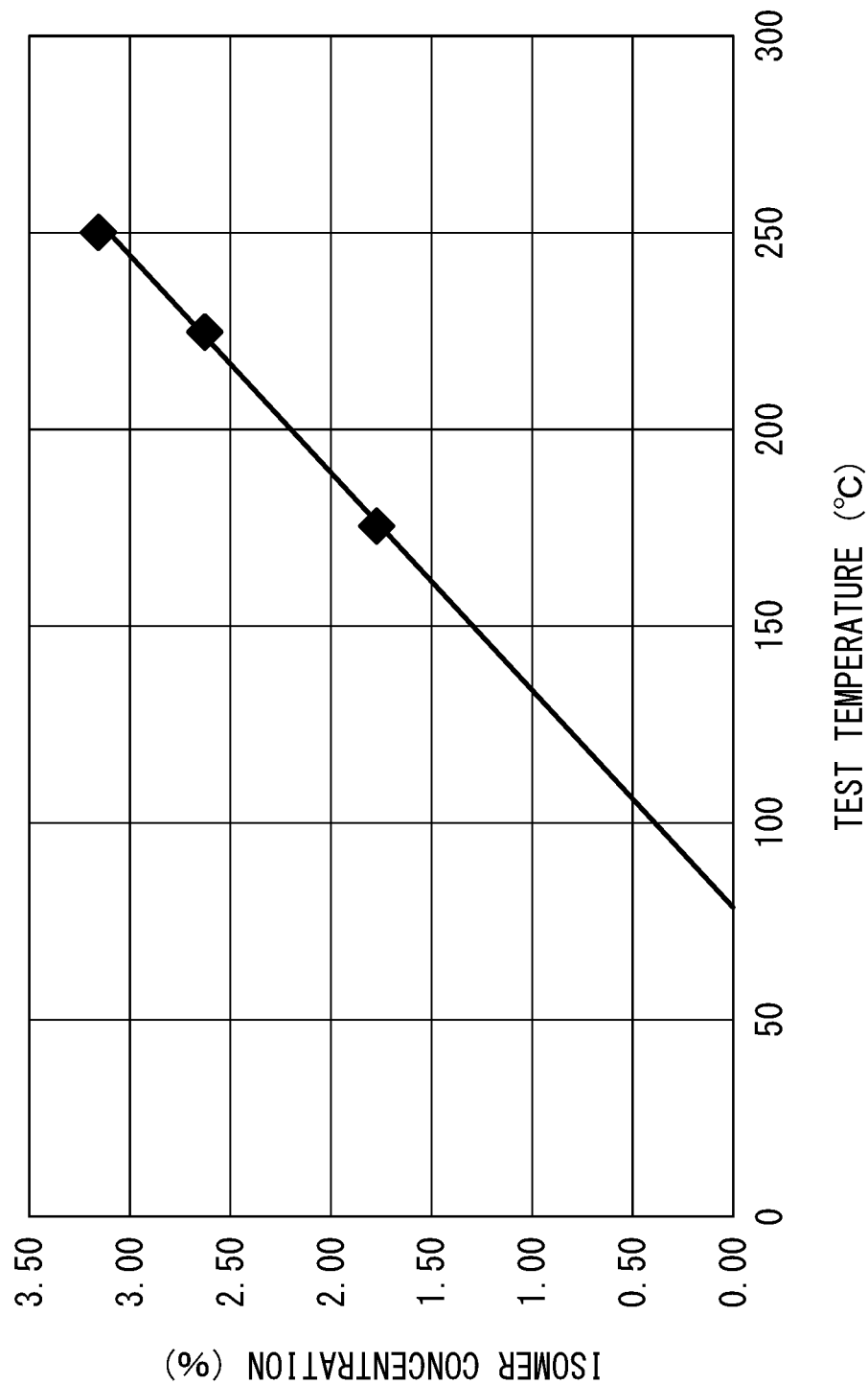
FIG. 3 is a diagram showing the relationship between the temperature and the equilibrium concentration of the geometric isomer.

FIG. 3 shows a graph obtained by calculating the average values of the geometric isomer concentration for each of the temperatures on the basis of the results of the above test. In FIG. 3, the horizontal axis is the test temperature (° C.), and the vertical axis is the average value (GC %) of the first equilibrium concentration of the geometric isomer.

According to FIG. 3, it has been suggested that the equilibrium concentration of the refrigerant substance (HCFO-1223xd (Z)) and the geometric isomer (HCFO-1223xd (E)) has a proportional relationship with the temperature.

From the above results, it has been confirmed that the isomerization of a refrigerant substance with which a geometric isomer may exist tends to increase as the temperature increases.

Third Embodiment

In the present embodiment, on the basis of the second embodiment, a heat pump cycle is filled with a mixed refrigerant, as the initial refrigerant. The mixed refrigerant is a non-azeotropic mixed refrigerant in which the boiling point of the refrigerant substance and the boiling point of the geometric isomer of the refrigerant substance are different from each other.

In the present embodiment, the temperature and the mixture concentration of a non-azeotropic mixed refrigerant in a heat exchanger (particularly condenser) are properly controlled. Specifically, the temperature of a heat exchange medium is controlled such that the geometric isomer concentration in a condensate liquid (non-azeotropic mixed refrigerant liquid) generated in a phase change process in a heat exchanger can be maintained at a concentration of the equilibrium concentration (second equilibrium concentration) or more at the temperature.

The heat pump according to the present embodiment may be provided with a control unit (not shown) programmed to properly control the temperature and the mixture concentration of a non-azeotropic mixed refrigerant in a heat exchanger (particularly condenser). The control unit is configured of a central processing unit (CPU), a random access memory (RAM), a read only memory (ROM), a computer readable storage medium, and the like.

Specifically, the control is performed as follows.

By adjusting the amount of a refrigerant in a condenser while confirming an outlet temperature of a heat exchanger on a heat exchange medium side with an expansion valve after passing through the heat exchanger (particularly condenser) on the heat exchange medium side, the temperature of a non-azeotropic mixed refrigerant is controlled.

Figure 4:
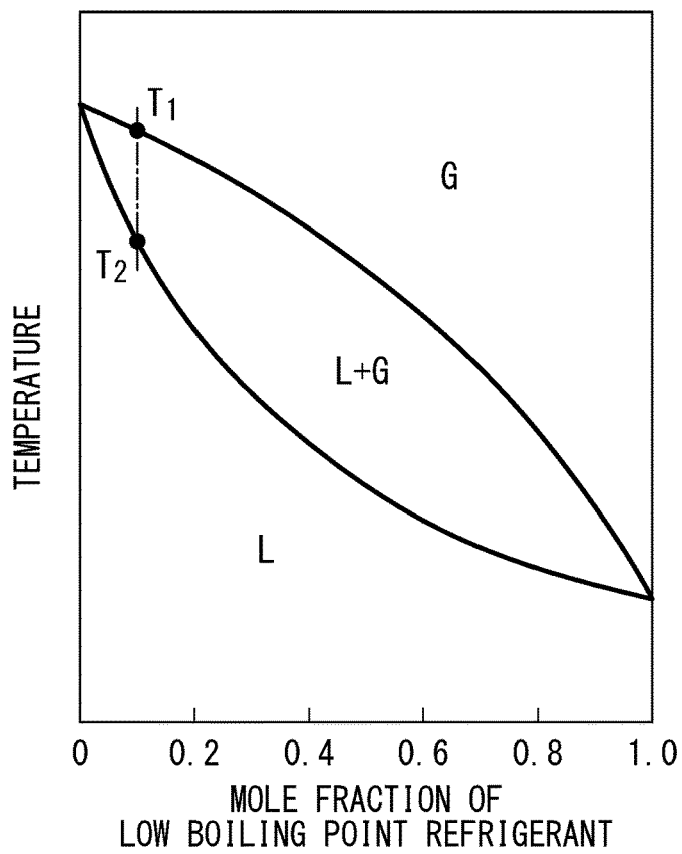
FIG. 4 is a diagram showing the characteristics of phase changes of a two-component based non-azeotropic mixed refrigerant.

FIG. 4 shows the characteristics of phase changes of a two-component based non-azeotropic mixed refrigerant. In FIG. 4, the horizontal axis is the mole fraction of a low boiling point component, the vertical axis is the temperature, G is the gas phase region, L is the liquid phase region, and G+L is the two-phase region where the gas phase and the liquid phase coexist.

As shown in FIG. 4, the gas phase line (evaporation temperature) and the liquid phase line (condensation temperature) of the non-azeotropic mixed refrigerant change depending on the component concentration. In the non-azeotropic mixed refrigerant, for example, when the mole fraction of a low boiling point component is 0.1, $T_1$ is a dew point, and $T_2$ is a boiling point.

In the evaporation under the same pressure, the low boiling point component tends to evaporate first, and during the condensation, the high boiling point component tends to condense first. For this reason, in the evaporation or the condensation under constant pressure, the component concentration and the temperature of the vapor and the condensate liquid change.

Figure 5:
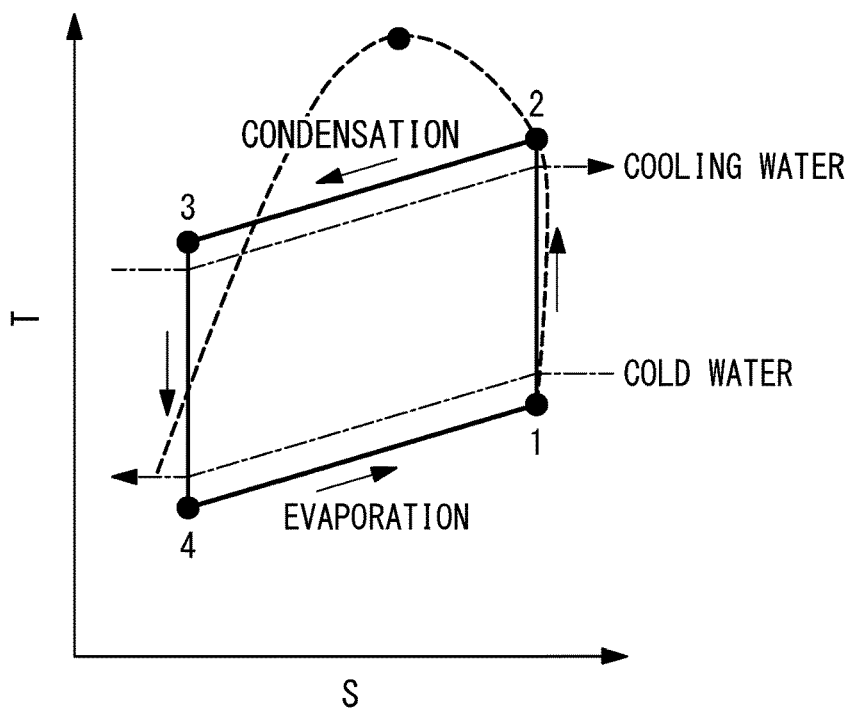
FIG. 5 is a diagram of the temperature-specific entropy (T-S) of a Lorentz cycle.

FIG. 5 shows a diagram of the temperature-specific entropy (T-S) of an ideal heat cycle (Lorentz cycle) in a case where a non-azeotropic mixed refrigerant is evaporated and condensed under equal pressure. In FIG. 5, the horizontal axis is the entropy (S), the vertical axis is the temperature, and the dashed lines are a saturated liquid line and a saturated vapor line. The Lorentz cycle is shown as 1→2→3→4→1 in FIG. 5.

During the condensation of a non-azeotropic mixed refrigerant, the high boiling point component gas condenses first, the low boiling point component concentration increases, and the gas temperature (dew point) falls. During the evaporation of a non-azeotropic mixed refrigerant, the low boiling point component liquid evaporates first, the high boiling point component concentration increases, and the liquid temperature (boiling point) rises. Therefore, in the Lorentz cycle, temperature slips such as 2→3, and 4→1 are generated in the condensation process and the evaporation process.

In the Lorentz cycle, by designing the system to satisfy the temperature difference (inclination of 2→3 or inclination of 4→1) of a non-azeotropic mixed refrigerant=the temperature difference (inclination of C→B or inclination of D→A) of a heat exchange medium (cooling water or cold water in FIG. 5) in the condensation step and the evaporation step, a highly efficient Lorentz cycle can be realized.

The value of the temperature difference of a non-azeotropic mixed refrigerant can be changed by the concentration ratio between the high boiling point component and the low boiling point component. The concentration ratio can be adjusted by controlling the temperature of a heat exchange medium.

REFERENCE SIGNS LIST 1 heat pump
2 compressor
3 condenser
4 expansion valve
5 evaporator
6 pipe

The invention claimed is:
1. A method for designing a heat pump whose closed circuit configured by connecting a compressor, a condenser, an expansion valve, and an evaporator in this order is filled with a refrigerant containing a refrigerant substance with which a geometric isomer may exist, the method comprising:

obtaining a first equilibrium concentration of the refrigerant substance and the geometric isomer of the refrigerant substance at an upper limit usage temperature of the heat pump; and using, as an initial refrigerant, a mixed refrigerant in which the refrigerant substance and the geometric isomer are mixed and in which the geometric isomer is contained at a concentration of the first equilibrium concentration or more.

2. The method for designing the heat pump according to claim 1, further comprising:

obtaining a second equilibrium concentration of the refrigerant substance and the geometric isomer at a temperature in the condenser, and controlling a temperature of a heat exchange medium in the condenser by adjusting an amount of the refrigerant in the condenser with the expansion valve after passing through the condenser such that a concentration of the geometric isomer in a mixed refrigerant liquid condensed by the condenser is maintained at a concentration of the second equilibrium concentration or more.

3. A heat pump whose closed circuit configured by connecting a compressor, a condenser, an expansion valve, and an evaporator in this order is filled with a refrigerant containing a refrigerant substance with which a geometric isomer may exist, wherein a first equilibrium concentration of the refrigerant substance and the geometric isomer of the refrigerant substance at an upper limit usage temperature of the heat pump is obtained, and the closed circuit is filled with a mixed refrigerant, as an initial refrigerant, in which the refrigerant substance and the geometric isomer are mixed and in which the geometric isomer is contained at a concentration of the first equilibrium concentration or more.

* * * * *